US009769489B2

(12) United States Patent
Sohoni et al.

(10) Patent No.: US 9,769,489 B2
(45) Date of Patent: *Sep. 19, 2017

(54) ERROR TRACKING AND MITIGATION FOR MOTION COMPENSATION-BASED VIDEO COMPRESSION

(71) Applicant: Imagination Technologies Limited, Kings Langley (GB)

(72) Inventors: Sudhanshu Sohoni, Maharashtra (IN); Parag Salasakar, Maharashtra (IN); Robert Graham Isherwood, Buckingham (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/236,801

(22) Filed: Aug. 15, 2016

(65) Prior Publication Data
US 2016/0353126 A1   Dec. 1, 2016

Related U.S. Application Data

(63) Continuation of application No. 14/656,376, filed on Mar. 12, 2015, now Pat. No. 9,445,117.

(30) Foreign Application Priority Data

Mar. 14, 2014   (GB) .................................. 1404563.7

(51) Int. Cl.
*H04N 19/895* (2014.01)
*H04N 19/513* (2014.01)
(Continued)

(52) U.S. Cl.
CPC ......... *H04N 19/521* (2014.11); *H04N 19/105* (2014.11); *H04N 19/139* (2014.11);
(Continued)

(58) Field of Classification Search
CPC ........................... H04N 19/521; H04N 19/895
See application file for complete search history.

(56) References Cited

U.S. PATENT DOCUMENTS

2003/0142749 A1* 7/2003 Hong ..................... H04N 19/51
375/240.16

FOREIGN PATENT DOCUMENTS

EP          0647919 B1    2/2000
KR     1020040047045 A    6/2004

OTHER PUBLICATIONS

Farber et al., "Robust H.263 Compatible Video Transmission over Wireless Channels," Proc. PCS '96, Mar. 1996.
(Continued)

*Primary Examiner* — Nam Pham
(74) *Attorney, Agent, or Firm* — Vorys, Sater, Seymour and Pease LLP; Vincent M DeLuca

(57) ABSTRACT

Methods and encoders for tracing an error in a frame of a video to a subsequent frame of the video. In response to receiving an error notification message indicating an error has occurred in an encoded frame during decode, an encoder obtains: (a) the minimum and maximum horizontal motion vector components for each column of blocks of the frame immediately following the error frame; and (b) the minimum and maximum vertical motion vector components for each row of blocks of the frame immediately following the error frame. A rectangular region of blocks of the frame immediately following the error frame that the error is likely to have propagated to is identified using the minimum and maximum horizontal and vertical motion vector components.

18 Claims, 11 Drawing Sheets

(51) Int. Cl.
*H04N 19/105* (2014.01)
*H04N 19/176* (2014.01)
*H04N 19/46* (2014.01)
*H04N 19/166* (2014.01)
*H04N 19/139* (2014.01)
*H04N 19/159* (2014.01)
*H04N 19/172* (2014.01)
*H04N 19/43* (2014.01)

(52) U.S. Cl.
CPC ......... *H04N 19/159* (2014.11); *H04N 19/166* (2014.11); *H04N 19/172* (2014.11); *H04N 19/176* (2014.11); *H04N 19/43* (2014.11); *H04N 19/46* (2014.11); *H04N 19/895* (2014.11)

(56) References Cited

OTHER PUBLICATIONS

Wiegand et al., "Error-Resilient Video Transmission Using Long-Term Memory Motion-Compensated Prediction," Journal on Selected Areas in Communications, vol. 18, No. 6, Jun. 2000, pp. 1050-.

NPL Documents Filed in Parent Application.

\* cited by examiner

ERROR TRACKING AND MITIGATION FOR MOTION COMPENSATION-BASED VIDEO COMPRESSION

BACKGROUND

Due to the large size of digital video data some form of compression is typically performed on digital video before it is transmitted across a network. One video compression technique that may be used is motion compensation-based compression which only transmits the difference between the video frame being encoded and a reference frame. Motion compensation compression exploits inter-frame redundancy. In particular, often, the only difference between sequential frames is a result of the camera moving or an object moving within the frame. This means that most of the information that describes one frame is the same as the information that describes the following frame.

However, network errors may mean that the receiver is unable to decode certain parts of an encoded video frame (i.e. because there is an error in the received information or because the receiver did not receive part of the encoded video) resulting in missing data which manifests itself as a visual artifact in the video. Since subsequent frames are dependent on previous frames any error or visual artifact in a particular frame propagates to subsequent frames. This has a cascading effect which causes a growing visual artifact in the video.

One way to mitigate the propagation of such errors or artifacts has been to introduce an intra-coded frame (i.e. a frame encoded using information contained only within the frame being encoded) upon determining an error has occurred. However, this technique does not achieve as high a compression ratio as inter-coding techniques (i.e. coding techniques, such as motion compensation-based compression techniques, that use information from another frame to code a frame) since such intra-coded frames use up a large amount of bandwidth in a non-uniform manner.

Another way to mitigate the propagation of such errors or artifacts has been to intra-code a portion (e.g. one or more blocks) of each frame. Different portions (e.g. blocks) of the frame are cyclically chosen over a sequence of frames. This technique more evenly distributes the additional data over time. However, since the intra-coded blocks may be derived spatially from neighboring inter-coded blocks of the same frame the effectiveness of this technique decreases due to the existing propagated error.

Accordingly, known techniques for mitigating error propagation increase the data transmitted between the encoder and decoder in either a uniform or non-uniform manner.

The embodiments described below are not limited to implementations which solve any or all of the disadvantages of known video compression techniques.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Described herein are methods and encoders for tracing an error in a frame of a video to a subsequent frame of the video. In response to receiving an error notification message indicating an error has occurred in an encoded frame during decode, an encoder obtains: (a) the minimum and maximum horizontal motion vector components for each column of blocks of the frame immediately following the error frame; and (b) the minimum and maximum vertical motion vector components for each row of blocks of the frame immediately following the error frame. A rectangular region of blocks of the frame immediately following the error frame that the error is likely to have propagated to is identified using the minimum and maximum horizontal and vertical motion vector components.

A first aspect provides a method of tracing an error in a frame of a video to a subsequent frame of the video, each frame in the video being divided into a plurality of blocks arranged in a number of rows and columns, each frame of the video being encoded by a technique that comprises generating motion vectors for blocks of the frame, the method comprising: (a) receiving an error notification message at an encoder, the error notification message comprising information identifying an erroneous frame of the video and information identifying portions of the erroneous frame detected as having an error during decoding; (b) identifying, at the encoder, the frame immediately following the erroneous frame as a reference frame; (c) obtaining, at the encoder, minimum and maximum horizontal motion vector components for each column of blocks of the reference frame; (d) obtaining, at the encoder, minimum and maximum vertical motion vector components for each row of blocks of the reference frame; and (e) identifying, at the encoder, a rectangular region of blocks of the reference frame that the error is likely to have propagated to from the minimum and maximum horizontal and vertical motion vector components for the reference frame.

A second aspect provides a method of mitigating propagation of an error in a frame of a video, the error being detected at a decoder, the method comprising: tracing the error, at an encoder, to a frame immediately preceding a next frame to be encoded in accordance with the first aspect; modifying the reference frame to identify the blocks in the identified rectangular region as being unusable for inter-frame encoding; and encoding the next frame using the modified reference frame.

A third aspect provides a video encoder to trace an error in a frame of a video to a subsequent frame of the video, each frame in the video being divided into a plurality of blocks arranged in a number of rows and columns, each frame of the video being encoded by a technique that comprises generating motion vectors for blocks of the frame, the encoder comprising: a communications interface configured to receive an error notification message, the error notification message comprising information identifying an erroneous frame and information identifying portions of the erroneous frame detected as having an error during decoding; and a processor in communication with the communications interface, the processor configured to: a. identify a frame immediately following the erroneous frame in the video as a reference frame; b. obtain minimum and maximum horizontal motion vector components for each column of blocks of the reference frame; c. obtain minimum and maximum vertical motion vector components for each row of blocks of the reference frame; and d. identify a rectangular region of blocks of the reference frame that the error is likely to have propagated to from the minimum and maximum horizontal and vertical motion vector components for the reference frame.

A fourth aspect provides a computer readable storage medium having encoded thereon computer readable program code for generating a video encoder of the third aspect.

A fifth aspect provides a computer readable storage medium having encoded thereon computer readable program code for generating a video encoder configured to perform the method of the first aspect.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

This acknowledges that firmware and software can be separately used and valuable. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Figure 1:
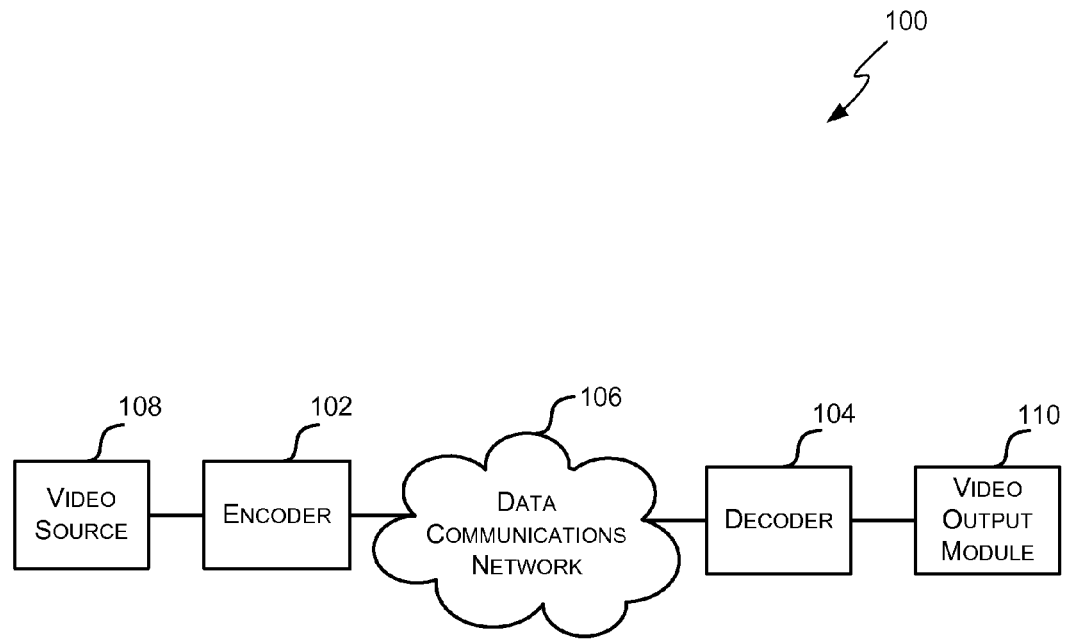
FIG. 1 is a block diagram of a known system for encoding video data using block motion compensation video compression.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

As described above, in motion compensation-based video compression the difference between the video frame being encoded and a reference frame is determined and only the difference is transmitted over the network. Motion compensation compression exploits the fact that, often, the only difference between two video frames is a result of the camera moving or an object moving. This means that most of the information that describes one frame is the same as the information that describes the following frame.

In block motion compensation-based compression each frame is divided into blocks of pixels (e.g. macroblocks of 16×16 pixels in MPEG). An attempt is then made to predict each block (i.e. target block) of a particular frame from a block (i.e. a matching block) in another frame (i.e. immediately preceding frame), referred to herein as the reference frame. Specifically, in the encoded video data each block of the frame being encoded may be represented by a motion vector which indicates where the block came from (i.e. the shift from the target block to the matching block). Each motion vector comprises an x or horizontal component representing movement in the horizontal direction and a y or vertical component representing movement in the vertical direction.

The reference frame is typically the frame of the video immediately preceding the frame to be encoded. However, it will be evident to a person of skill in the art that another frame of the video may be used as the reference frame. It will also be evident to a person of skill in the art that more than one reference frame may be used. For example, some blocks may be encoded using blocks of a first reference frame and other blocks may be encoded using blocks of a second reference frame.

Reference is now made to FIG. 1 which illustrates a known system 100 for encoding video data using block motion compensation video compression. The system 100 comprises an encoder 102 arranged to receive and encode video data using a block motion compensation video compression technique; a decoder 104 for receiving and decoding the encoded video data; and a data communications network 106 for transmitting the encoded video data from the encoder 102 to the decoder 104.

The encoder 102 is a computing-based device capable of encoding video data. The encoder 102 receives video data from a video source 108. The video source 108 may be a device, such as a camera, that provides live video; a device, such as memory, that stores a pre-recorded video; or a combination thereof.

In response to receiving the video data from the video source 108 the encoder 102 is arranged or configured to encode the video data using a block motion compensation compression technique or codec, such as H. 264. As described above, a block motion compensation compression technique, such as H. 264, uses blocks from another frame (i.e. the reference frame) to encode a frame.

In particular, for each block of the frame to be encoded (referred to as the target block) a block most closely matching the block to be encoded (referred to as the matching block) is found in a reference frame (i.e. the immediately preceding frame). Where the block to be encoded does not exactly match the block in the reference frame there is said to be error residue. Once the matching block has been identified the motion vector representing the shift from the target frame to the matching block is determined. The motion vector is a two-dimensional vector (i.e. it has horizontal and vertical components) that describes the target block with respect to movement of the matching block in the reference frame.

The compression efficiency of the motion vector and error residue together (i.e. the inter-coding technique) is then compared against an intra-coding technique for each block and the more efficient encoding technique is chosen for each block. Accordingly, for each block where inter-coding is efficient there will be a motion vector associated with it which will be used to encode the block. Conversely, the blocks where inter-coding is not efficient will not have a motion vector associated with it. The encoded video data is then sent to the decoder 104 via the data communications network 106.

The decoder 104 is a computing-based device for decoding encoded video data. The decoder 104 receives the encoded video data from the encoder 102 via the data communications network 106 and decodes the received encoded video data. The decoder 104 then provides the decoded video to a video output module 110 for display. The video output module 110 may be any suitable device, such as a television, computer screen, or mobile phone display, for displaying video.

As described above, errors in the data communications network 106 may mean that the decoder 104 is unable to decode portions (i.e. one or more blocks) of an encoded video frame. This may be, for example, because the decoder did not receive part of the encoded video frame (e.g. it was lost) or because an error occurred during transmission that corrupted part of the encoded video frame. Any block that the decoder 104 is unable to decode may appear as a visual artifact in the video. Since the information the decoder receives for a particular frame is in reference to one or more previous frames (i.e. there is temporal dependence between frames), any error or artifact in a particular frame will be propagated and spread to subsequent frames.

Accordingly, methods have been developed for mitigating the propagation of such errors in block motion compensation-based video compression systems.

Figure 2:
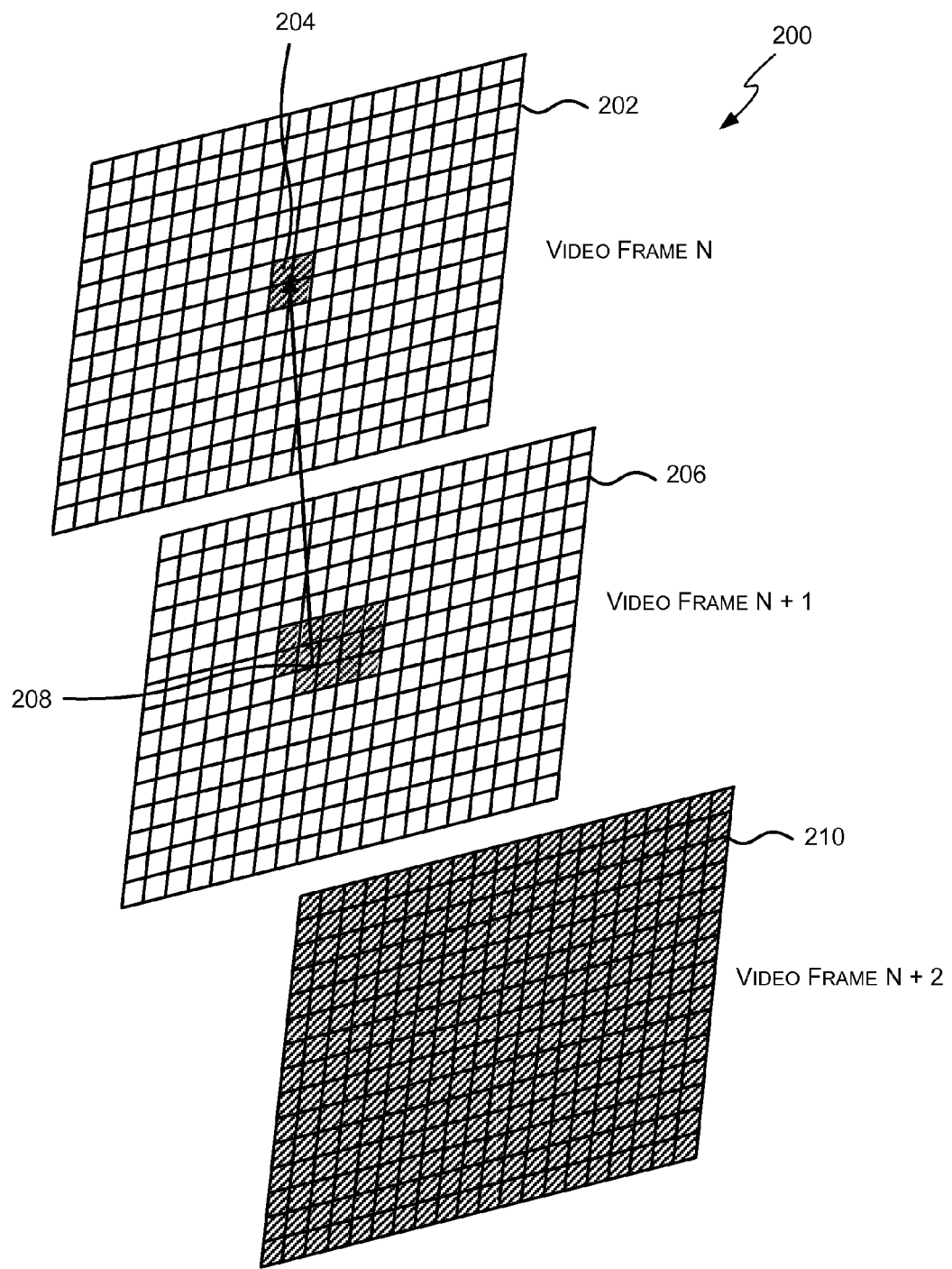
FIG. 2 is a schematic diagram illustrating a known method for mitigating propagation of errors in the system of FIG. 1.

Reference is now made to FIG. 2 which illustrates a known method 200 for mitigating the propagation of errors in a block motion compensation-based video compression system, such as the system 100 of FIG. 1. In the method 200, the encoder 102 divides video frame N 202 into blocks of pixels, encodes the divided video frame using a block motion compensation-based compression technique, such as MPEG2, MPEG4 or H. 274, and transmits the encoded frame over the data communications network 106. When the encoded video frame N 202 is subsequently received and decoded by the decoder 104, the decoder 104 may be unable to decode one or more blocks 204 of the video frame N 202. As described above, this may be because the packets containing the encoded data for those blocks were lost, or there was an error in the received encoded data for those blocks that inhibited the decoder from being able to decode those blocks. The blocks that are not properly decoded appear as visual artifacts in the output video.

The subsequent video frame, video frame N+1 206 is similarly divided into blocks of pixels and encoded using the same block motion compensation-based compression technique as video frame N 202 by the encoder 102. When the decoder 104 receives the encoded data for video frame N+1 206 it uses the encoded data to generate video frame N+1 206 from video frame N 202. This temporal dependence between frames means that the error 204 in video frame N 202 is propagated and spread to video frame N+1 206 producing a larger error or visual artifact 208.

To mitigate or reduce the effect of the error on subsequent frames the decoder 104 notifies the encoder 102 of the error in video frame N 202. The encoder then encodes video frame N+2 210 as an intra-coded frame. Specifically, it encodes video frame N+2 210 using only information within that frame. This removes the temporal dependency and thus stops the spreading and propagation of the error, but it does so at the cost of increasing the data sent between the encoder 102 and the decoder 104. This is because intra-coded frames are typically not as efficiently encoded or compressed as inter-coded frames. In addition, since an intra-coded frame is larger than an inter-coded frame it typically takes longer to reach the decoder which causes a delay in receiving the next temporally-encoded frame exacerbating the problem.

Instead of implementing periodic intra-frame encoding as described in reference to FIG. 2, other compression techniques implement partial intra-frame encoding for each frame to mitigate error propagation. While this also increases the amount of data transmitted between the encoder 102 and decoder 104 it does so on a regular basis instead of periodically. Accordingly, there is a desire for a technique to mitigate the propagation of errors or artifacts in a video stream without significantly increasing the amount of data transmitted between the encoder and decoder.

Embodiments described herein relate to systems and methods for tracking and mitigating propagation of errors in block motion compensation-based video compression without significantly increasing the data transmitted between the encoder and decoder. In particular, in the embodiments described herein the encoder stores dependency information for each frame that allows an error to be traced to the current frame. Specifically, for each frame the encoder stores maximum and minimum values of the motion vector components for each column and each row of the blocks of the frame. When the encoder subsequently receives a message from the decoder that an error has occurred in certain blocks in a particular encoded frame during decoding, the encoder uses the stored maximum and minimum values to trace the error from the particular encoded frame to the reference frame for the next frame to be encoded. The tracing identifies blocks of the reference frame that are likely to have been affected by the error identified by the decoder. The blocks of the reference frame that have been identified as likely being affected by the error are then marked as unusable for compression so the next frame to be encoded will not be encoded using any of the affected blocks of the reference frame.

Figure 3:
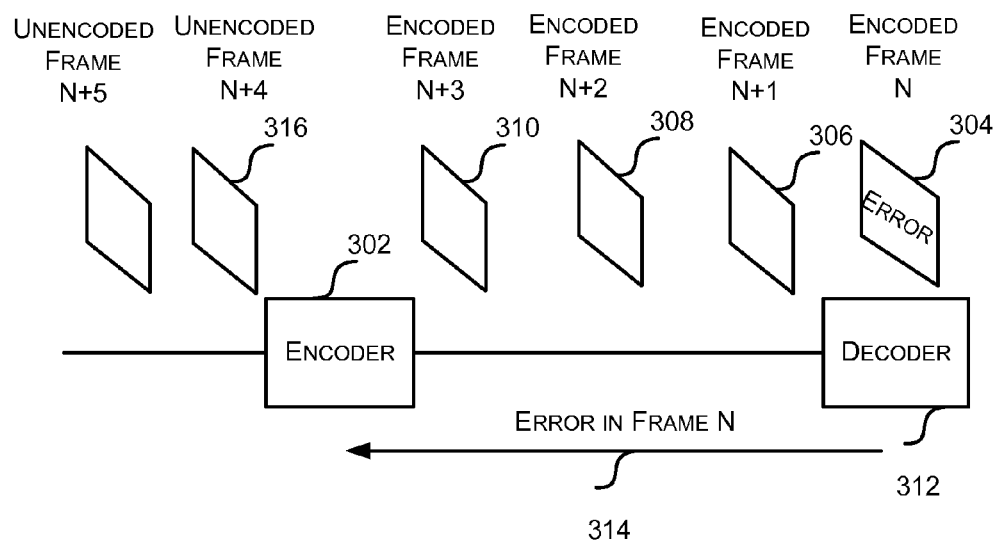
FIG. 3 is a schematic diagram illustrating an error in an encoded frame.

I In the example of FIG. 3, an encoder 302 has encoded and transmitted video frames N to N+3 (304 to 310). When the decoder 312 attempts to decode encoded frame N 304 it identifies an error in encoded frame N 304. In response to detecting the error the decoder 312 sends an error notification message 314 to the encoder 302 to notify the encoder 302 of the error in frame N 304. In response to receiving the error notification message 314 the encoder 302 uses the stored motion vector maximum and minimum values to trace the error in frame N to the reference frame for the next frame to be encoded. When the encoder 302 receives the error notification message 314 the next frame to be encoded is frame N+4 316. The reference frame for frame N+4 316 is frame N+3 310. Accordingly, in this example the encoder 302 uses the stored maximum and minimum values to trace the error in frame N 304 to frame N+3 310. In particular, the encoder 302 uses the stored maximum and minimum values to identify blocks of frame N+3 310 that are likely to have been affected by the error in frame N 304. The blocks of the reference frame (frame N+3) that are identified as being affected by the error in frame N are then marked as being unusable for inter-frame encoding so that frame N+4 316 will not be encoded using any of the affected blocks of frame N+3 310.

The methods and systems described herein may be used in any application which uses an encoder and one or more decoders concurrently. For example, the methods and systems described herein may be used in video over IP, live video surveillance, video on demand, and live video transcoding applications to provide an improved visual quality experience to users.

Figure 4:
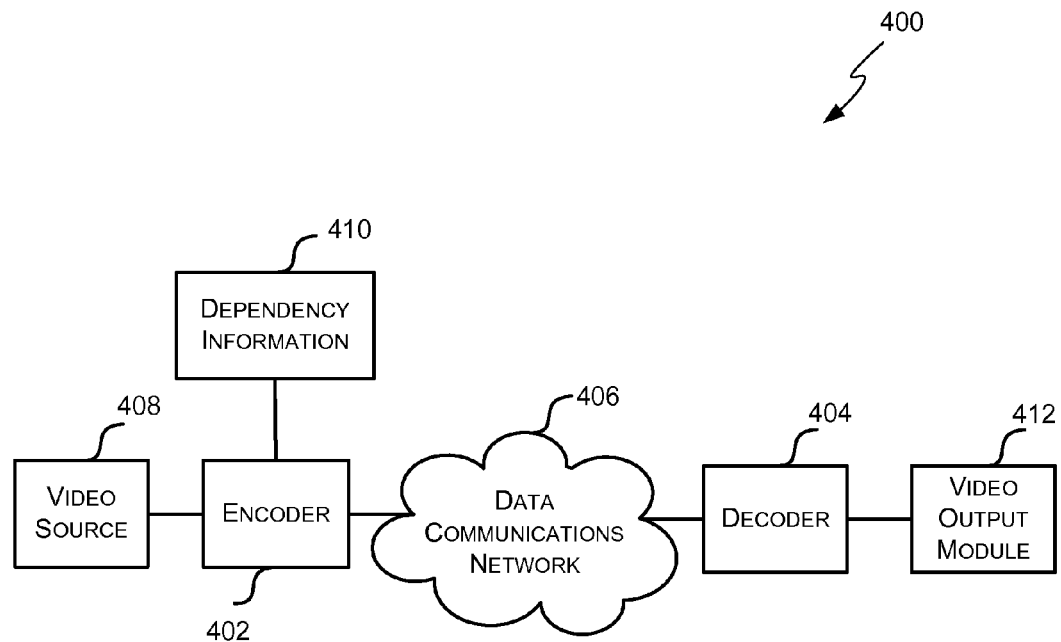
FIG. 4 is a block diagram of an example system for encoding video data using block motion compensation video compression where dependency information is stored.

Reference is now made to FIG. 4 which illustrates a system 400 for tracking and mitigating the propagation of errors or artifacts in motion compensation-based video compression. The system comprises an encoder 402 arranged to receive and encode video data and store dependency information 410; a decoder 404 for receiving and decoding the encoded video data; and a data communications network 406 for transmitting the encoded video data from the encoder 402 to the decoder 404.

The encoder 402, similar to the encoder 102 of FIG. 1, is a computing-based device capable of encoding video data. The encoder 402 receives video data from a video source 408. The video source 408 may be a device, such as a camera, that provides live video; a device, such as memory, that stores a pre-recorded video; or a combination thereof.

In response to receiving the video data from the video source 408 the encoder 402 is arranged or configured to encode the video data using a block motion compensation-based compression technique or codec, such as H. 264. The encoded video data is then sent to the decoder 404 via the data communications network 406.

The encoder 402 of FIG. 4 is further arranged or configured to store dependency information 410 for each encoded frame that explains the relationship between blocks of the encoded frame and blocks of the reference frame(s). In particular, the dependency information 410 describes what blocks of the reference frame(s) were used to encode blocks of the encoded frame. For example, if frame N is encoded using frame N−1 (the reference frame) then the dependency information links the blocks of frame N−1 to the blocks of frame N.

Since the encoder 402 does not know where an error will occur the dependency information allows an error in a particular encoded frame to be traced or tracked (after the fact) to one or more subsequent frames. Specifically, since the dependency information 410 links blocks of an encoded frame to the blocks of the reference frame (i.e. the immediately preceding frame) an error in the reference frame can be traced to the encoded frame using the dependency information. For example, if the dependency information indicates that block 1 of the reference frame was used to encode block 2 of the next frame, if an error occurs in block 1 of the reference frame during decode then the dependency information can be used to trace the error in block 1 to block 2 of the subsequent frame. Specifically, the dependency information can be used to determine that the error likely propagated to block 2 of the next frame.

While storing the motion vectors for each block of a frame would allow the encoder to accurately trace an error in one frame to subsequent frames, this would require storing a large amount of information. It has been identified that errors tend to propagate as a rectangular area. This is because video is typically transmitted in the form of a series of packets. Each packet typically comprises an individually decodable slice of the video image. The slices are generally raster-scanned sets of blocks of the video image which form a substantially rectangular area. Loss or corruption of any part of the packet causes visual artifacts in the shape of the slice (which is substantially rectangular). Furthermore the artifacts tend to propagate around this area within an area approximated by one or more rectangular boxes. Accordingly, an accurate estimate of the blocks affected by any particular block in a reference frame can be generated by defining a rectangular area based on the movement of blocks in the same row and column.

Accordingly, in embodiments described herein the dependency information 410 that is stored by the encoder 402 for each frame is the maximum and minimum of the horizontal and vertical components of the motion vectors on a row and column basis. Specifically, the encoder 402 stores the maximum and minimum of the horizontal component of the motion vectors for each column of blocks and the maximum and minimum of the vertical component of the motion vectors for each row of blocks. The maximum and minimum values can then be used to trace an error to blocks in subsequent frames. An example method for generating the dependency information 410 is described with reference to FIG. 5 and an example of dependency information 410 is described with reference to FIG. 6.

In some cases the encoder 402 may only store the minimum and maximum values for a predetermined number of frames. The predetermined number of frames may be based on the round-trip latency between the encoder 402 and the decoder 404. In particular, the dependency information (i.e. the maximum and minimum values) for a particular frame only needs to be stored until enough time has elapsed that the encoder 402 can presume that if the encoder 402 has not received an error message for the particular frame the decoder 404 has successfully received and decoded the frame. Accordingly, the encoder 402 may be configured to keep a rolling window of dependency information that relates to the frames that have been encoded and sent, but not yet successfully decoded by the decoder 404.

The decoder 404 is a computing-based device for decoding encoded video data. The decoder 404 receives the encoded video data from the encoder 402 via the data communications network 406 and is configured or arranged to decode the received encoded video data. The decoder 404 may provide the decoded video to a video output module 412 for display. The video output module 412 may be any suitable device for displaying video, such as a television, computer screen, or mobile phone display; visual rendering hardware; any suitable device for storing video data, such as memory; or a combination thereof.

If the decoder 404 encounters an error while decoding the encoded video data the decoder 404 transmits an error notification message to the encoder 402 via the data communications network 406. The notification message comprises information identifying the frame and the portion(s) of that frame with an error. The notification message may be in any suitable form. For example, in some cases the notification message may comprise a standard macroblock error bitmap which explicitly identifies the block(s) with errors. In other cases, the notification message may comprise information that identifies the column(s) and row(s) with errors.

Upon receiving an error notification message the encoder 402 uses the information in the notification message to identify the error block(s). The encoder 402 then uses the stored dependency information to track or trace the error(s) to the frame immediately preceding the next frame to be encoded by the encoder 402. For example, if an error occurred in frame N and frame N+5 is the next frame to be encoded, the encoder 402 uses the stored dependency information to trace the propagation of the error(s) from frame N to frame N+4.

In particular, the encoder 402 uses the dependency information (i.e. minimum and maximum horizontal and vertical motion vector components) to identify columns and rows in subsequent frames that the error is likely to have propagated to. The encoder 402 then uses the column and row information to identify one or more rectangular areas in subsequent frames that the error is likely to have propagated to. Once the encoder 402 has traced the error to one or more rectangular areas in the frame immediately preceding the next frame to be encoded, the encoder 402 marks any blocks of the immediately preceding frame that have been identified as likely to have been affected by the error as unusable for encoding purposes. Then when the next frame is encoded the blocks likely affected by the error will not be used for encoding. This mitigates propagation of the error.

The data communications network 406 may be any network, or combination of networks, capable of enabling data communication between the encoder 402 and the decoder 404. For example, the data communications network 406 may be a public switched telephone network (PSTN), a mobile telephone network, a wireless data network, a wired data network, or any combination thereof.

Although a single data communications network 406 is shown, it will be evident to a person of skill in the art that the data communications network 406 may comprise a plurality of connected data communications networks or a plurality of separate and independent data communications networks.

Figure 5:
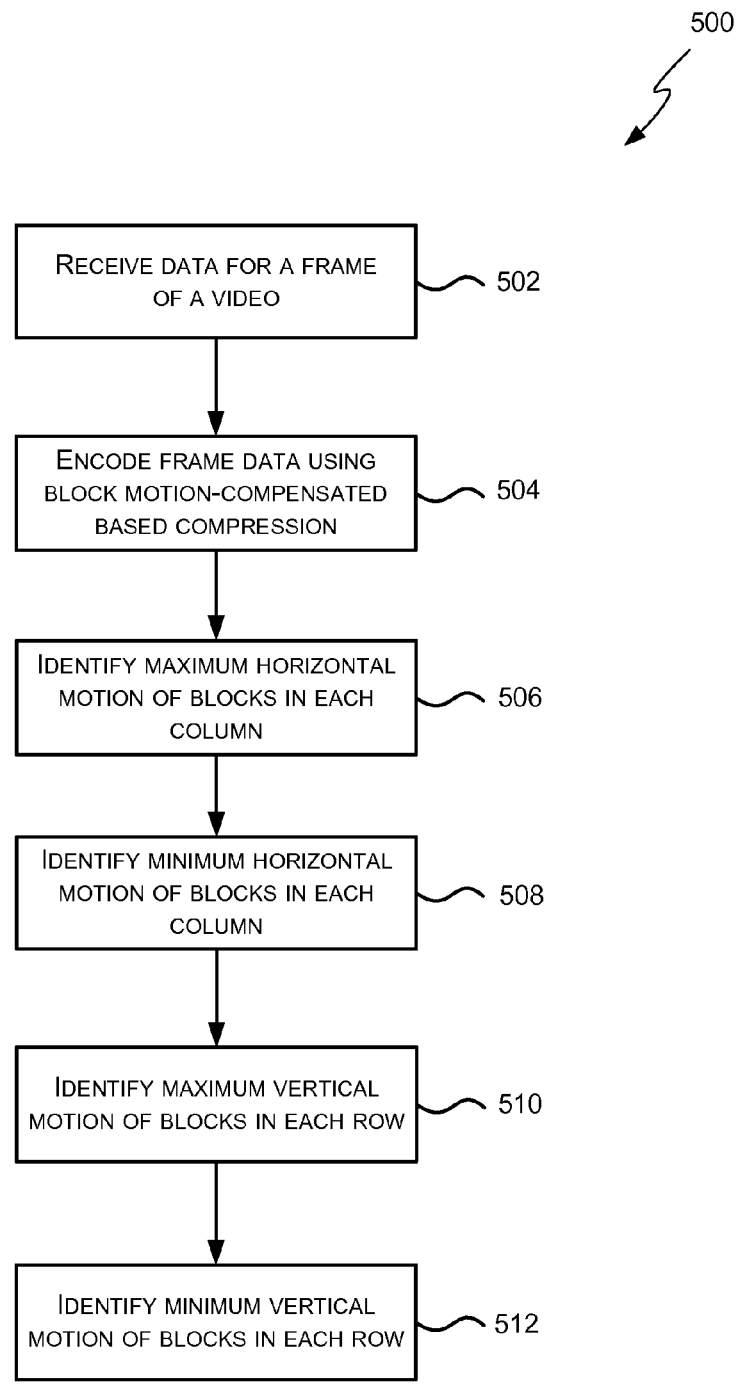
FIG. 5 is a flowchart of an example method for generating the dependency information of FIG. 4.

Reference is now made to FIG. 5 which illustrates a flow chart of a method 500 for generating the dependency information 410 (i.e. minimum and maximum horizontal and vertical motion vector components) which may be implemented by the encoder 402 of FIG. 4. At step 502, the encoder 402 receives data representing a frame of the video (referred to herein as frame data) from the video source 408. In response to receiving the frame data, the method 500 proceeds to step 504.

At step 504, the encoder 402 encodes the frame data using a block motion compensation-based video compression technique. As described above, block motion compensation-based video compression techniques comprise attempting to generate a motion vector for each block of the frame. As noted above, in some cases a motion vector may not be generated for every block of the frame. For example, it may not be possible or efficient to generate a motion vector for certain blocks.

The motion vectors may be recorded in a matrix referred to as the FrameMV matrix. The FrameMV matrix comprises an entry for each block in the frame. Each entry represents the motion vector (x component and y component) for that block. The FrameMV entries are indexed by row (x) and column (y) number so that FrameMV(x, y) represents the motion vector for the block in the $x^{th}$ row and the $y^{th}$ column. FrameMVx (x, y) represents only the x component (i.e. horizontal component) of the motion vector for the block in the $x^{th}$ row and the $y^{th}$ column and FrameMVy (x, y) represents only the y component (i.e. vertical component) for the block in the $x^{th}$ row and the $y^{th}$ column. Once the encoder 402 has encoded the frame (including generating the motion vectors for the frame) the method 500 proceeds to step 506.

At step 506, the encoder 402 determines the maximum horizontal motion of the blocks in each column. In some cases the encoder 402 determines the maximum horizontal motion of the blocks in each column by calculating the maximum horizontal component (i.e. x-component) of the motion vectors for the blocks in each column. The encoder 402 may save these maximum values in an array referred to as the MaxMVx array. The MaxMVx array comprises an entry for each column of blocks in the frame. Each entry represents the maximum horizontal component of the motion vectors for the blocks in that column. In some cases the MaxMVx array may be generated from the FrameMVx matrix using equation (1) where TotalBlockRows is the total number of block rows in the frame and TotalBlockCols is the total number of block columns in the frame.

$$\text{MaxMV}x(\text{ColBlkIdx})= \max_{0 \le RowBlkIdx \le TotalBlockRows} \text{FrameMV}x(\text{ColBlkIdx}, \text{RowBlkIdx})$$
$$\forall \text{ColblockIdx}=0 \rightarrow \text{TotalBlockCols} \quad (1)$$

Once the encoder has calculated the maximum horizontal motion vector component for each column, the method 500 proceeds to step 508.

At step 508, the encoder determines the minimum horizontal motion of the blocks in each column. In some cases the encoder determines the minimum horizontal motion of the blocks in each column by calculating the minimum horizontal component (i.e. x-component) of the motion vectors for the blocks in each column. The encoder 402 may save these minimum values in an array referred to as the MinMVx array. The MinMVx array comprises an entry for each column of blocks in the frame. Each entry represents the minimum horizontal component of the motion vectors for the blocks in that column. In some cases the MinMVx array may be generated from the FrameMV matrix using equation (2).

$$\text{MinMV}x(\text{ColBlkIdx})= \min_{0 \le RowBlkIdx \le TotalBlockRows} \text{FrameMV}x(\text{ColBlkIdx}, \text{RowBlkIdx})$$
$$\forall \text{ColblockIdx}=0 \rightarrow \text{TotalBlockCols} \quad (2)$$

Once the encoder has calculated the minimum horizontal motion vector component for each column, the method 500 proceeds to step 510.

At step 510, the encoder 402 determines the maximum vertical motion of the blocks in each row. In some cases the encoder 402 determines the maximum vertical motion of the blocks in each row by calculating the maximum vertical component (i.e. y-component) of the motion vectors for the blocks in each row. The encoder may save these maximum values in an array referred to as the MaxMVy array. The MaxMVy array comprises an entry for each row of blocks in the frame. Each entry represents the maximum vertical component of the motion vectors for the blocks in that row. In some cases the MaxMVy array may be generated from the FrameMV matrix using equation (3).

$$\text{MaxMV}y(\text{RowBlkIdx}) = \max_{0 \le ColBlkIdx \le TotalBlockCols} \text{FrameMV}y(\text{ColBlkIdx,RowBlkIdx}) \quad \forall \text{RowblockIdx}=0 \rightarrow \text{TotalBlockRows} \quad (3)$$

Once the encoder has calculated the maximum vertical motion vector component for each row, the method 500 proceeds to step 512.

At step 512, the encoder 402 calculates the minimum vertical component (i.e. y-component) of the motion vectors for the blocks in each row. In some cases the minimum vertical component values are saved or stored in an array referred to as the MinMVy array. The MinMVy array comprises an entry for each row of blocks in the frame. Each entry represents the minimum vertical component of the motion vectors for the blocks in that row. In some cases the MinMVy array may be generated from the FrameMV matrix using equation (4).

$$\text{MinMV}y(\text{RowBlkIdx}) = \min_{0 \le ColBlkIdx \le TotalBlockCols} \text{FrameMV}y(\text{ColBlkIdx,RowBlkIdx}) \quad \forall \text{RowblockIdx}=0 \rightarrow \text{TotalBlockRows} \quad (4)$$

Once the encoder has calculated the minimum vertical motion vector component for each row, the method 500 ends.

Where a particular block has been intra-frame encoded (e.g. because intra-frame encoding was deemed to more efficient) that block will not have a motion vector associated with it. That particular block may be ignored or treated as having a null motion vector when determining the maximum and minimum horizontal and vertical components of the motion vectors for the blocks in each row and column.

Figure 6:
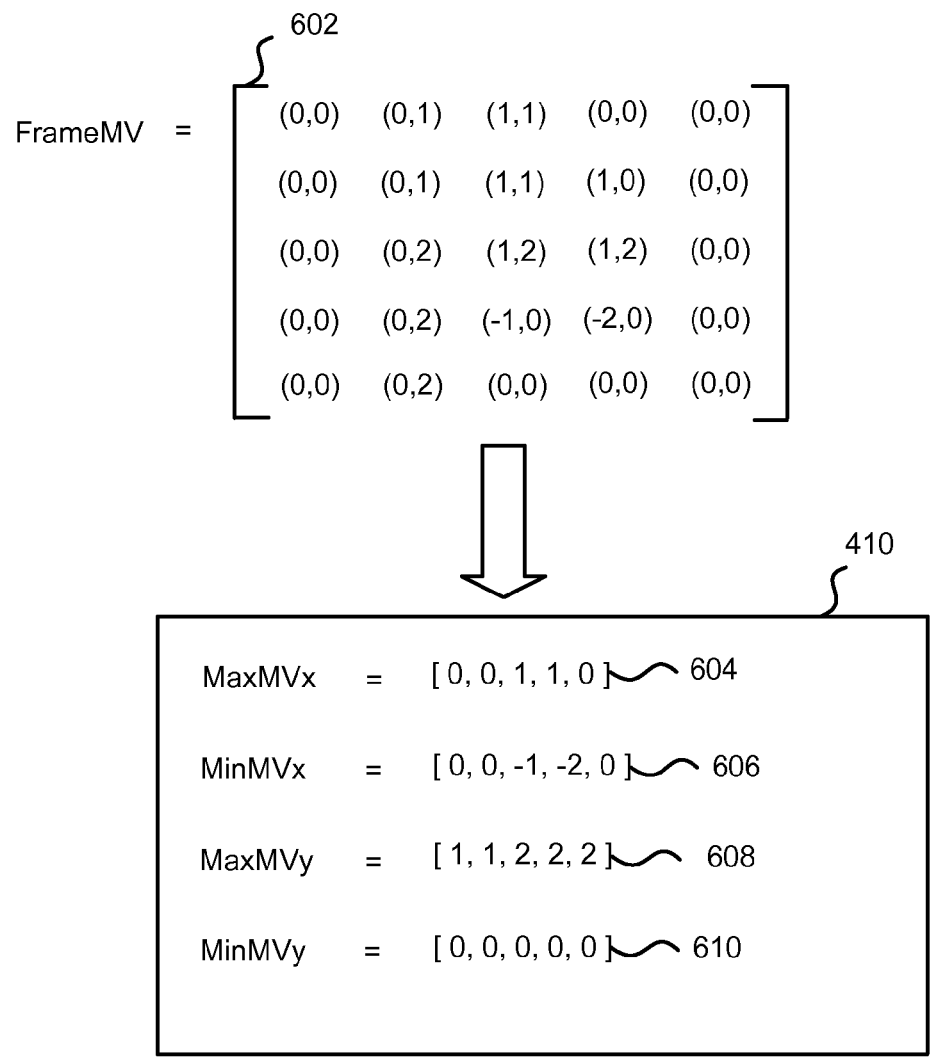
FIG. 6 shows an example of the dependency information of FIG. 4.

Reference is now made to FIG. 6 which illustrates an example of the dependency information 410 that may be generated and stored by the encoder 402 of FIG. 4 using, for example, the method of FIG. 5. FIG. 6 illustrates a FrameMV matrix 602 that stores the motion vectors for a frame with twenty-five blocks divided into five rows and five columns. Accordingly, the FrameMV matrix has twenty-five entries, one for each block in the frame. Each entry has two components a horizontal or x component that represents horizontal motion of the corresponding block with respect to the reference (i.e. previous) frame, and a vertical or y component that represents vertical motion of the corresponding block with respect to the reference (i.e. previous) frame. For ease of explanation, the unit of measurement of the motion vectors is blocks. Accordingly, an x-component with a value of 1 means motion of 1 block in the positive horizontal direction (i.e. right), and a y-component with a value of −2 means motion of 2 blocks in the negative vertical direction (i.e. down). However, it will be evident to a person of skill in the art that any other suitable unit of measurement may be used for the motion vector components, such as pixels or sub-pixels.

As described above in reference to FIG. 5, the FrameMV matrix 602 may be converted into one or more arrays (e.g. MaxMVx 604, MinMVx 606, MaxMVy 608 and MinMVy 610610) which represent the maximum and minimum horizontal and vertical motion vector components on a row and column basis. In particular, as described above the MaxMVx array 604 has an entry for each column of blocks that represents the maximum horizontal motion vector component for the blocks in that column; the MinMVx array 606 has an entry for each column of blocks that represents the minimum horizontal motion vector component for the blocks in that column; the MaxMVy array 608 has an entry for each row of blocks that represents the maximum vertical motion vector component for the blocks in that row; the MinMVy array 610 has an entry for each row of blocks that represents the minimum vertical motion vector component for the blocks in that row. Together these four arrays (MaxMVx 604, MinMVx 606, MaxMVy 608 and MinMVy 610) form the dependency information 410.

In the example shown in FIG. 6, the frame comprises five rows of blocks and five columns of blocks thus the four arrays (MaxMVx 604, MinMVx 606, MaxMVy 608 and MinMVy 610) each have five entries, one for each column or row. It will be evident to the person of skill in the art that the dependency arrays (MaxMVx 604, MinMVx 606, MaxMVy 608 and MinMVy 610) may have more or fewer entries depending on the number of rows and columns of blocks in the frame.

Figure 7:
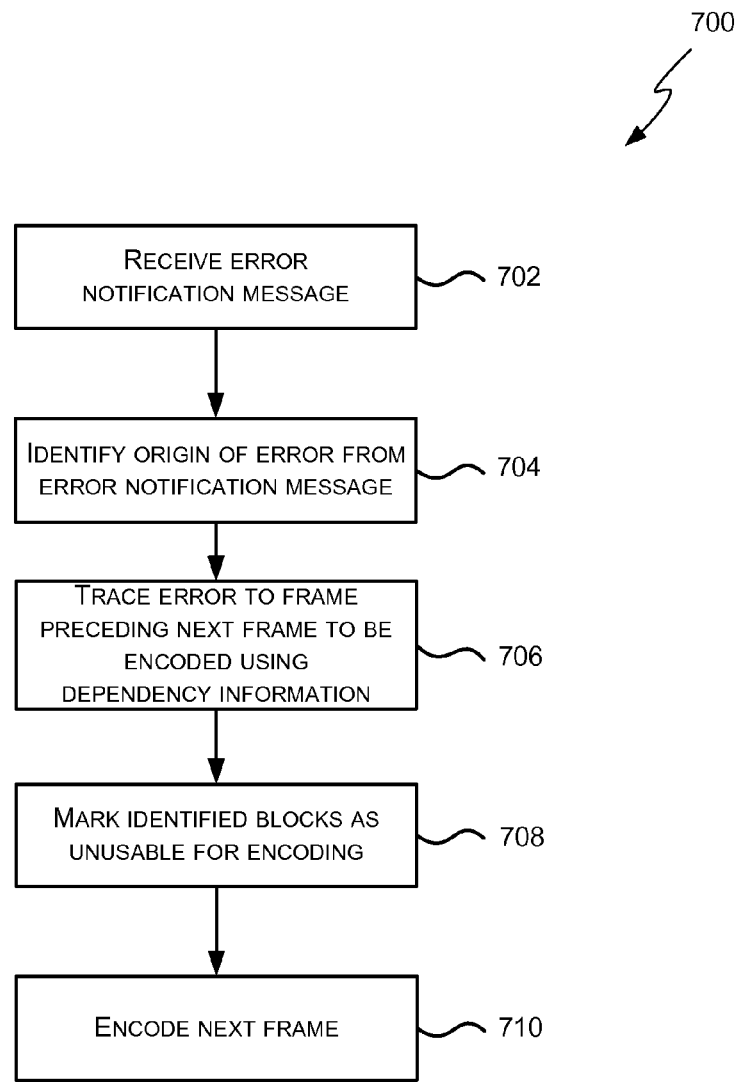
FIG. 7 is a flowchart of an example method for mitigating the propagation of errors using the dependency information of FIG. 4.

Reference is now made to FIG. 7 which illustrates a flow chart of a method 700 for mitigating error propagation in a block motion compensation-based video compression system which may be implemented by the encoder 402 of FIG. 4. At step 702, the encoder 402 receives an error notification message from the decoder 404. As described above, the error notification message comprises information that indicates the frame and the portion (i.e. blocks) of that frame with an error. The notification message may be in any suitable form. For example, in some cases the notification message may comprise a standard macroblock error bitmap which explicitly identifies the block(s) of the frame with errors. In other cases, the notification message may comprise information identifying the column(s) and row(s) with errors. In response to receiving the error notification message, the method 700 proceeds to step 704.

At step 704, the encoder 402 analyses the error notification message to identify the origin of the error. The origin of the error is defined as the particular frame and portion(s) (i.e. blocks) of that frame with an error. The frame in which the error occurred will be referred to as the erroneous frame and the blocks within the erroneous frame in which the error occurred will be referred to herein as the erroneous blocks. In response to identifying the origin of the error, the method 700 proceeds to step 706.

At step 706, the encoder 402 uses the stored dependency information (i.e. the maximum and minimum arrays) to trace the error from the erroneous frame to the reference frame for the next frame to be encoded. Where the reference frame is the frame immediately preceding the frame to be encoded the error is traced from the erroneous frame to the frame immediately preceding the next frame to be encoded. Specifically, the encoder 402 uses the dependency information to identify blocks of the frame immediately preceding the next frame to be encoded that are likely to have been affected by the error. In other words the encoder 402 uses the dependency information to identify the propagation of the error from the erroneous frame to the reference frame for the next frame to be encoded.

In some cases the encoder 402 uses the dependency information 410 (i.e. minimum and maximum horizontal and vertical motion vector components) to identify columns and rows of the frame immediately following the erroneous frame that are likely to have been affected by the error(s). The overlap of the affected columns and rows defines a rectangular area of blocks that are likely to have been affected by the error (i.e. it is likely the error has propagated to these blocks). This process is repeated for each subsequent frame until the error is traced to the frame immediately preceding the next frame to be encoded.

Figure 8:
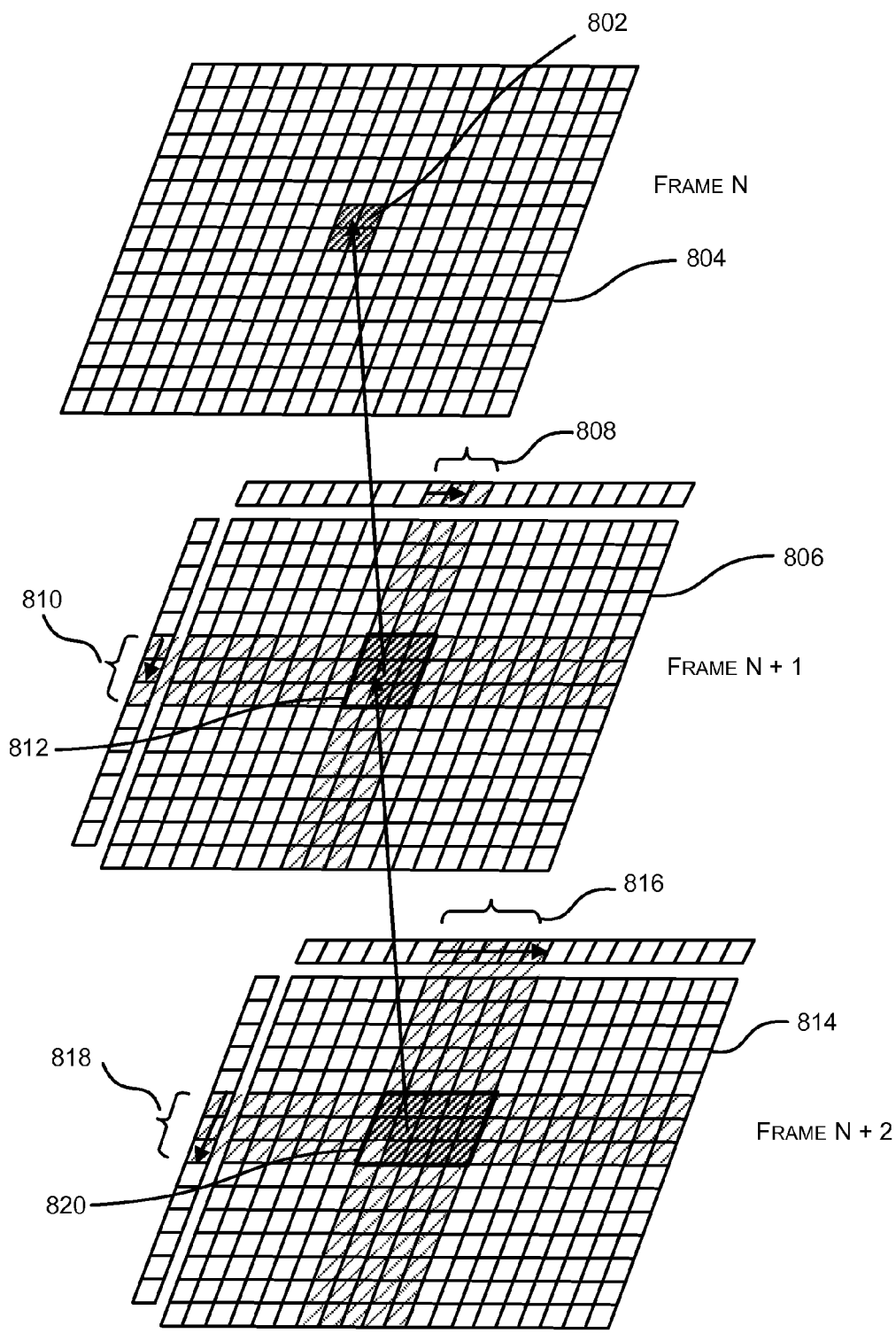
FIG. 8 is a schematic diagram illustrating an example method for tracing an error in an erroneous frame to subsequent frames using the dependency information of FIG. 4.

For example, as shown in FIG. 8, an error 802 occurs in frame N 804. The encoder 402 uses the dependency information (i.e. maximum and minimum vertical and horizontal motion vector components) for frame N+1 806 to identify columns 808 and rows 810 of frame N+1 806 that are likely to have been affected by the error 802 (i.e. it is likely the error has propagated to these columns and rows). The intersection of these columns 808 and rows 810 define a rectangular region 812 of blocks that are likely to have been affected by the error 802.

This process is then repeated for the next frame, frame N+2 814. In particular, the encoder 402 uses the dependency information (i.e. maximum and minimum vertical and horizontal motion vector components) for frame N+2 814 to identify columns 816 and rows 818 of frame N+2 814 that are likely to have been affected by the error region 812 of frame N+1 806. The intersection of these columns 816 and rows 818 define a rectangular region 820 of blocks that are likely to have been affected by the error 802. This process is then repeated for each subsequent frame (i.e. N+3, N+4 etc.) until the error is traced to the frame immediately preceding the next frame to be encoded.

An exemplary method for tracing the error from the erroneous frame to the frame immediately preceding the next frame to be encoded using the dependency information 410 will be described below with reference to FIG. 10. Referring back to FIG. 7, once the error has been traced to the frame immediately preceding the next frame to be encoded, the method 700 proceeds to step 708.

At step 708, the blocks in the frame immediately preceding the next frame to be encoded that were identified in step 706 as likely being affected by the error are marked or otherwise identified as being unusable for inter-frame encoding. For example, with reference to FIG. 8 if frame N+3 is the next frame to be encoded then the blocks in the rectangular region 820 of frame N+2 814 are marked as being unusable for inter-frame encoding. Once the blocks of the frame immediately preceding the current frame identified as likely being affected by the error are marked as being unusable for inter-frame encoding the method 700 proceeds to step 710.

At step 710, the next frame to be encoded is encoded using a block motion compensated-based compression technique. Since a number of blocks of the reference frame have been marked as being unusable for inter-frame encoding any block in the next frame to be encoded that corresponds to (or refers to) a block in the reference frame that has been marked as unusable for inter-frame encoding is encoded using other techniques. In some cases the blocks that correspond (or refer to) an unusable block in the reference frame are encoded based on the last successfully delivered frame (i.e. the frame immediately preceding the erroneous frame). In other cases (e.g. where the compression technique used does not support multiple reference frames or no reference region is available) the blocks that correspond to (or refer to) an unusable block in the reference frame are intra-frame encoded (i.e. encoded using only information from the frame itself). For example, the blocks that correspond to (or refer to) an unusable block in the reference frame may be classified into contiguous runs of blocks in raster scan order (or block encoding order) which are encoded as independently decodable intra slices.

Figure 9:
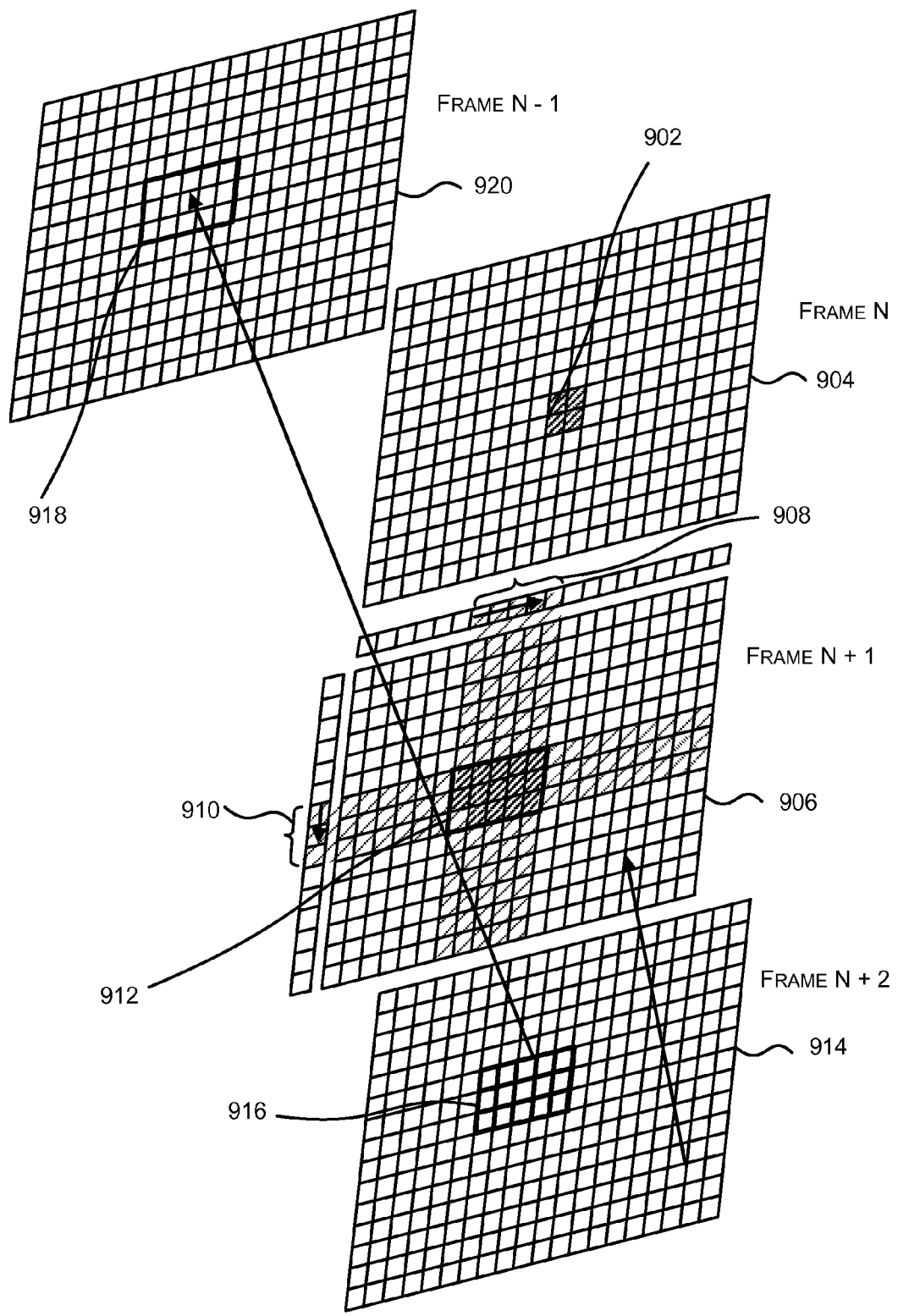
FIG. 9 is schematic diagram illustrating the method of FIG. 7.

Reference is now made to FIG. 9 which illustrates a method for encoding a frame wherein a portion of the reference frame has been identified as being unusable for inter-frame encoding. In particular, in the example of FIG. 9, an error 902 occurs in frame N 904. The encoder 402 uses the dependency information (i.e. maximum and minimum vertical and horizontal motion vector components) for frame N+1 906 to identify columns 908 and rows 910 of frame N+1 906 that are likely to have been affected by the error 902 (i.e. it is likely the error has propagated to these columns and rows). The intersection of these columns 908 and rows 910 define a rectangular region 912 of blocks that are likely to have been affected by the error (i.e. it is likely the error has propagated to these blocks). The encoder 402 then marks the blocks in the identified region 912 as being unusable for encoding. Then when the encoder 402 encodes frame N+2 914, the blocks 916 of frame N+2 that correspond (or refer to) the blocks in the identified region 912 of frame N+1 906 cannot be encoded using the blocks in the identified region 912. In some cases these blocks 916 may be encoded using the corresponding region 918 in the last successfully delivered frame (i.e. frame N−1 920).

Figure 10:
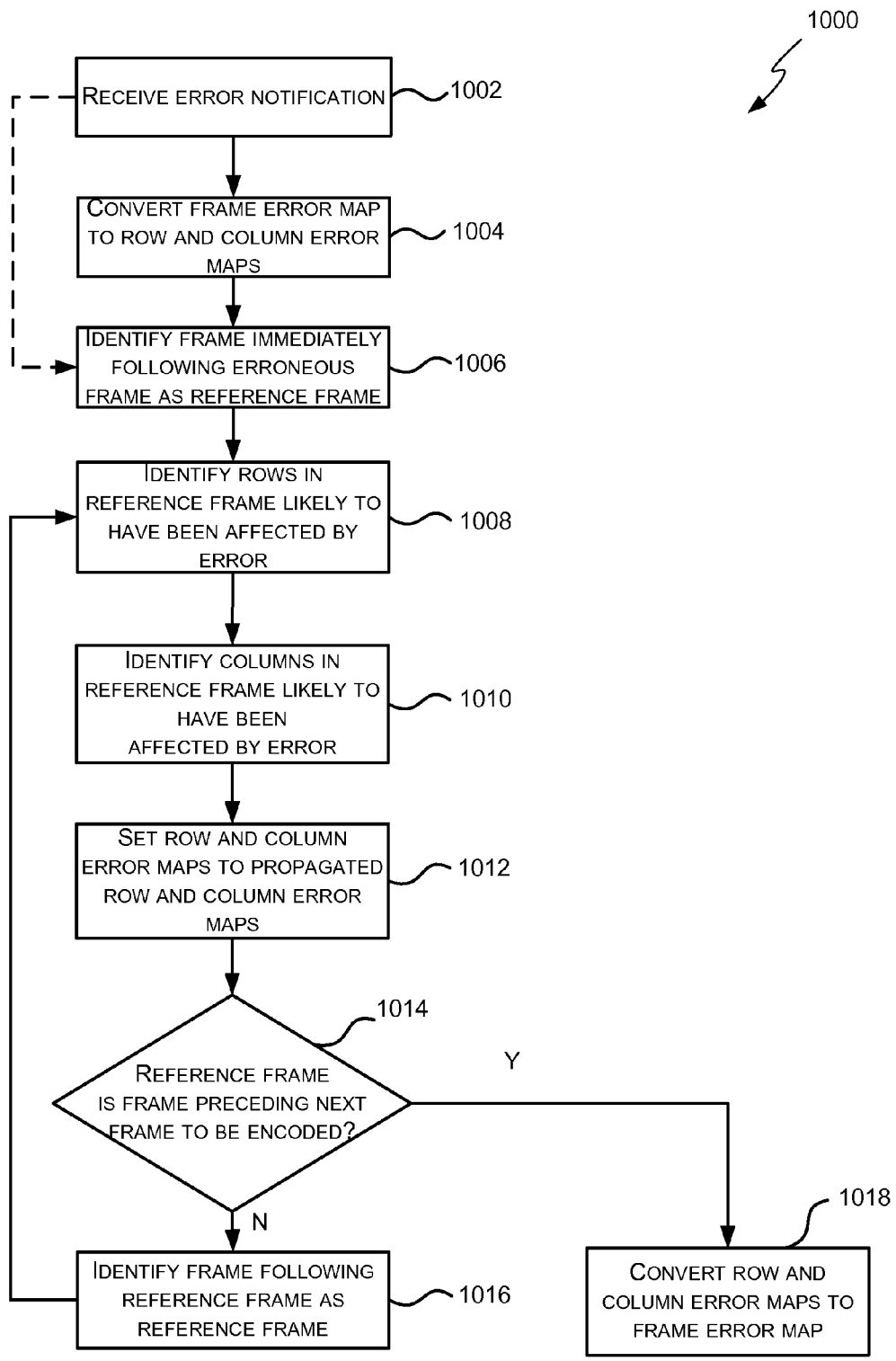
FIG. 10 is a flowchart of an example method for tracing an error in an erroneous frame to subsequent frames using the dependency information of FIG. 4.

Reference is now made to FIG. 10 which illustrates an exemplary method 1000 for tracing an error to subsequent frames using the dependency information 410 (i.e. maximum and minimum motion vector components) which may be executed by the encoder 402. At step 1002 the encoder 402 receives an error notification message that comprises information that identifies the erroneous frame and the portions (i.e. blocks) of the erroneous frame that had an error during decoding.

In some cases the information identifying the portion of the erroneous frame that had an error during decoding may comprise a column error map and a row error map that indicate the columns and rows, respectively, of the frame that had an error during decode. The row and column error maps may be implemented as arrays referred to herein as RowErrorMap and ColErrorMap arrays respectively. The RowErrorMap has an entry for each row of the frame. Each entry indicates whether the corresponding row had an error during decoding. For example RowErrorMap (x) indicates whether the $x^{th}$ row had an error during decoding. Similarly, the ColErrorMap has an entry for each column of the frame. Each entry indicates whether the corresponding column had an error during decoding. For example, ColErrorMap (y) indicates whether the $y^{th}$ row had an error during decoding.

In other cases the information identifying the portion of the erroneous frame that had an error during decode may comprise a frame error map that identifies the blocks that had an error during decode. The frame error map may be implemented by a matrix referred to herein as an FBFrameErrorMap matrix. The FBFrameErrorMap matrix comprises an entry for each block in the frame. Each entry indicates whether the corresponding block had an error during decoding. The FBFrameErrorMap entries are indexed by row (x) and column (y) number so that FBFrameErrorMap (x, y) indicates whether there was an error in the block in the $x^{th}$ row and the $y^{th}$ column during decode. Where the information identifying the portions of the erroneous frame is a frame error map the method 1000 proceeds to step 1004 where the frame error map is converted into row and column error maps (i.e. RowErrorMap and ColErrorMap arrays). Where, however, the information identifying the portions of the erroneous frame is row and column error maps the method 1000 proceeds directly to step 1006.

At step 1004, the frame error map (i.e. FBFrameErrorMap) is converted into row and column error maps. In some cases converting the frame error map into row and column error maps comprises analyzing the frame error map to identify rows and columns that had an error during decoding. For example, the row error map (i.e. RowErrorMap array) may be generated from the frame error map (i.e. FBFrameErrorMap matrix) using equation (5).

$$RowErrorMap(YBlkIdx) = \bigvee_{XBlkIdx=0}^{TotalBlockCols} FBFrameErrorMap(XBlkIdx, YBlkIdx)$$
$$\forall YBlkIdx = 0 \rightarrow TotalBlockRows \quad (5)$$

Similarly, the column error map (i.e. ColErrorMap array) may be generated from the frame error map (i.e. FBFrameErrorMap matrix) using equation (6).

$$ColErrorMap(XBlkIdx) = \bigvee_{YBlkIdx=0}^{TotalBlockRows} FBFrameErrorMap(XBlkIdx, YBlkIdx)$$
$$\forall XBlkIdx = 0 \rightarrow TotalBlockCols \quad (6)$$

Once the frame error map has been converted into row and column error maps, the method 1000 proceeds to step 1006.

At step 1006, the encoder identifies the frame immediately following the erroneous frame as the reference frame. Once the reference frame has been identified the method 1000 proceeds to step 1008.

At step 1008, the encoder 402 identifies rows in the reference frame that are likely to have been affected by the error using the row error map (i.e. RowErrorMap) for the frame immediately preceding the reference frame and the dependency information (i.e. minimum and maximum vertical motion vector components (MinMVy and MaxMVy)) for the reference frame. For example, if the erroneous frame is frame N, then the encoder 402 uses the row error map for frame N and the dependency information for frame N+1 to estimate the rows of frame N+1 that are affected by the erroneous blocks in frame N. If a row has been identified as likely being affected by the erroneous blocks then it is likely that the error has propagated to this row.

In some cases, the information identifying rows in the reference frame that are likely to have been affected by the error are stored in an array referred to herein as the PropRowErrorMap array. The PropRowErrorMap array, like the RowErrorMap array, has an entry for each row of blocks of the frame. Each entry indicates whether the corresponding row is likely to have been affected by the error (i.e. the error is likely to have propagated to this row). For example PropRowErrorMap (x) indicates whether the $x^{th}$ row is likely to have been affected by the error. The PropRowErrorMap array may be generated from equation (7) where the StartIdx is generated from equation (8) and the EndIdx is generated from equation (9) where BLKHEIGHT is the height of a block in pixels or sub-pixels depending on the units of the motion vectors and ROUNDFACTOR is a factor that aids in calculating the worst case propagation of the error. In some cases ROUNDFACTOR is equal to half of BLKHEIGHT to achieve 'ceiling' or upper rounding functionality in integer division. In other cases ROUNDFACTOR may be set to zero (to achieve 'floor' or lower rounding functionality). Setting ROUNDFACTOR to zero reduces the number of addition operations that are performed, but this reduction is made at the cost of reduced accuracy.

$$PropRowErrorMap(BlkIdx) = \bigvee_{Idx=StartIdx(BlkIdx)}^{EndIdx(BlkIdx)} RowErrorMap(Idx) \quad (7)$$
$$\forall BlkIdx = 0 \rightarrow TotalBlockRows$$

$$StartIdx(BlkIdx) = BlkIdx + Int\left(\frac{MinMVy(BlkIdx)}{BLKHEIGHT}\right) \quad (8)$$

$$EndIdx(BlkIdx) = BlkIdx + Int\left(\frac{MaxMVy(BlkIdx) + ROUNDFACTOR}{BLKHEIGHT}\right) \quad (9)$$

Once the rows of the reference frame that the error is likely to have propagated to have been identified, the method 1000 proceeds to step 1010.

At step 1010, the encoder 402 identifies the columns in the reference frame that are likely to have been affected by the error using the column error map (i.e. ColErrorMap) for the frame immediately preceding the reference frame and the dependency information (i.e. minimum and maximum horizontal motion vector components (MinMVx and MaxMVx)) for the reference frame. For example, if the erroneous frame is frame N, then the encoder 402 uses the column error map for frame N and the dependency information for frame N+1 to estimate the columns of frame N+1 that are likely to have been affected by the erroneous blocks in frame N. If a column has been identified as likely being affected by the erroneous blocks then it is likely that the error has propagated to this column.

In some cases, information identifying columns in the reference frame that are likely to have been affected by the error are stored in an array referred to herein as the PropColErrorMap array. The PropColErrorMap array, like the ColErrorMap array, has an entry for each column of blocks of the frame. Each entry indicates whether the corresponding column is likely to have been affected by the error. For example PropColErrorMap (y) indicates whether the $y^{th}$ column is likely to have been affected by the error. The PropColErrorMap array may be generated from equation (10) where the StartIdx is generated from equation (11) and the EndIdx is generated from equation (12). BLKWIDTH is the width of a block in pixels or sub-pixels depending on the units of the motion vectors and ROUNDFACTOR is a factor used to calculate the worst case propagation of the error. In some cases ROUNDFACTOR is equal to half of BLKWIDTH.

$$PropColErrorMap(BlkIdx) = \bigvee_{Idx=StartIdx(BlkIdx)}^{EndIdx(BlkIdx)} ColErrorMap(Idx) \quad (10)$$
$$\forall BlkIdx = 0 \rightarrow TotalBlockCols$$

$$StartIdx(BlkIdx) = BlkIdx + Int\left(\frac{MinMVx(BlkIdx)}{BLKHEIGHT}\right) \quad (11)$$

$$EndIdx(BlkIdx) = \quad (12)$$
$$BlkIdx + Int\left(\frac{MaxMVx(BlkIdx) + ROUNDFACTOR}{BLKWIDTH}\right)$$

Once the columns of the reference frame that the error is likely to have propagated to have been identified, the method 1000 proceeds to step 1012.

At step 1012, the encoder 402 sets the RowErrorMap to the PropRowErrorMap calculated in step 1008 and the ColErrorMap to the PropColErrorMap calculated in step 1010. The method 1000 then proceeds to step 1014.

At step 1014, the encoder 402 determines whether the frame immediately following the reference frame is the next frame to be encoded by the encoder 402. If it is determined that the frame immediately following the reference frame is the next frame to be encoded then then method 1000 proceeds to step 1018. If, however, it is determined that the frame immediately following the reference frame is not the next frame to be encoded then the method proceeds to step 1016.

At step 1016, the encoder 402 identifies the frame immediately following the reference frame as the reference frame and the method 1000 proceeds back to step 1008. Accordingly the process of using the dependency information to identify rows and columns of a frame that are likely to have been affected by an error in the immediately preceding frame is repeated for each frame following the erroneous frame up to the frame immediately preceding the next frame to be encoded. In other words the process is repeated for each previously encoded frame following the erroneous frame At step 1018, the encoder 402 converts the row and column error maps (i.e. RowErrorMap and ColErrorMap) for the reference frame to a frame error map. The frame error map identifies a rectangular region of blocks of the reference frame which the error is likely to have propagated to. The rectangular region is defined as the intersection of the identified columns and rows (i.e. RowErrorMap and ColErrorMap).

In some cases the frame error map for the reference frame is stored as a matrix. Such a matrix will be referred to herein as a RefFrameErrorMap matrix. Similar to the FBFrameErrorMap matrix that may be received from the decoder 404, the RefFrameErrorMap matrix comprises an entry for each block in the frame. Each entry indicates whether the original error is likely to have propagated to the corresponding block. The RefFrameErrorMap entries are indexed by row (x) and column (y) number so that FBFrameErrorMap (x, y) indicates whether the error is likely to have propagated to the block in the $x^{th}$ row and the $y^{th}$ column.

In some cases the RefFrameErrorMap array may be generated from the row and column error maps (i.e. RowErrorMap and ColErrorMap) using equation (13).

RefFrameErrorMap($X$BlkIdx,$Y$BlkIdx)=RowErrorMap($Y$BlkIdx)×ColErrorMap($X$BlkIdx)
∀$X$BlkIdx=0→TotalBlockCols∀$Y$BlkIdx=0→TotalBlockRows(13)

The resulting RefFrameErrorMap array defines a rectangular region of blocks which are identified as likely being affected by the original error (i.e. it is likely that the error has propagated to these blocks). Once the row and column error maps have been converted into a frame error map the method 1000 ends.

An example will be used to further describe the method 1000 of FIG. 10. In this example each frame consists of twenty-five blocks divided into five columns and five rows where the rows and columns are number from 0 to 4. Frame N+1 has the minimum and maximum horizontal and vertical motion vector component arrays (MaxMVx, MinMVx, MaxMVy, MinMVy) shown in equations (14) to (17). For ease of explanation, the motion vector components are presented in units of blocks. However, it will be evident to a person of skill in the art that other units of measurement may be used to represent the motion vector components. For example, the motion vector components may be represented in units of pixels or sub-pixels.

MaxMV$x$=[0,0,−1,0,0] (14)

MinMV$x$=[0,0,1,0,0] (15)

MaxMV$y$=[0,0,−1,0,0] (16)

MinMV$y$=[0,1,1,0,0] (17)

If there is an error in the block in row 1 and column 2 of frame N, the frame error map (FBFrameErrorMap) for frame N will be as shown in equation (18).

$$FBFrameErrorMap = \begin{bmatrix} 0,0,0,0,0, \\ 0,0,1,0,0 \\ 0,0,0,0,0 \\ 0,0,0,0,0 \\ 0,0,0,0,0 \end{bmatrix} \quad (18)$$

Upon receiving the frame error map (FBFrameErrorMap) of equation (18) for frame N, the encoder 402 may convert the frame error map (FBFrameErrorMap) into the row and column error maps (RowErrorMap and ColErrorMap) of equations (19) and (20) for frame N using equations (5) and (6) described above. Specifically, the encoder generates row and column error maps indicating that there is an error in row 1 and column 2.

RowErrorMap=[0,1,0,0,0] (19)

ColErrorMap=[0,0,1,0,0] (20)

Once the row and column error maps (RowErrorMap and ColErrorMap) have been generated the encoder 402 uses the row error map (RowErrorMap) for frame N and the dependency information (i.e. MaxMVy, MinMVy) for frame N+1 to estimate the rows of frame N+1 that the error has propagated to. For example, the encoder 402 may generate the propagated row error map (ProRowErrorMap) of equation (23) using equation (7) described above. To do this the encoder 402 first generates the start id and end id for each row as shown in equations (21) and (22) from equations (8) and (9). It has been assumed, for simplicity, that the block size is 1 and the rounding factor is zero. As can be seen from equation (23) it is estimated that the error is propagated to row 1 and row 2.

StartIdx=[0,1,1,3,4] (21)

EndIdx=[0,2,3,3,4] (22)

PropRowErrorMap=[0,1,1,0,0] (23)

Once the propagated row error map has been generated the encoder uses the column error map (ColErrorMap) for frame N and the dependency information (i.e. MaxMVx, MinMVx.) for frame N+1 to estimate the columns of frame N+1 that the error has propagated to. For example, the encoder 402 may generate the propagated column error map (PropColErrorMap) of equation (26) using equation (10) described above. To do this the encoder 402 first generates the start id and end id for each column as shown in equations (24) and (25) from equations (11) and (12). For simplicity, it has been assumed that the block size is 1 and the rounding factor is zero. As can be seen from equation (26) it is estimated that the error is propagated to column 1 and column 2.

StartIdx=|0,1,1,3,4| (24)

EndIdx=[0,1,3,3,4] (25)

PropColErrorMap=[0,0,1,0,0] (26)

Once the propagated column error map has been generated the row and column error maps (RowErrorMap and ColErrorMap) are set to the propagated row and column error maps (PropRowErrorMap and PropColErrorMap).

Assuming frame N+1 is the frame preceding the next frame to be encoded, once the propagated row and column error maps have been set to the propagated row and column error maps, the row and column error maps are converted to the reference frame error map of equation (27) using equation (13) described above to identify the blocks of frame N+1 that are likely to have been affected by the error in frame N. As can be seen from equation (27) it is estimated that the error will be propagated to a rectangular region of frame N+1 including the blocks at row 1, column 2; and row 2, column 2.

$$RefFrameErrorMap = \begin{bmatrix} 0, 0, 0, 0, 0, \\ 0, 0, 1, 0, 0 \\ 0, 0, 1, 0, 0 \\ 0, 0, 0, 0, 0 \\ 0, 0, 0, 0, 0 \end{bmatrix} \quad (27)$$

Although the methods and systems have been described in reference to encoders that implement fixed size block motion compensation-based compression techniques it will be evident to a person of skill in the art that the methods and system described herein may also be used with encoders that implement a variable size block motion compensation-based compression technique. As described above, in a fixed size block motion compensation-based compression technique the frames are divided into a number of equal-sized blocks of pixels (e.g. macroblocks of 16×16 pixels). Each block is predicted from a block of equal size in the reference frame.

In a variable size block motion compensation-based compression technique the encoder may dynamically select the size of the blocks and each block does not have to be the same size. For example, the encoder may be able to select blocks of size 8×8 pixels to 64×64 pixels. In cases where the block size is variable, the encoder may be configured to store the dependency information at the minimum block size used. For example, if an encoder has the ability to select block sizes between 8×8 pixels and 64×64 pixels then the motion vector information is stored and analyzed at an 8×8 pixel level. Accordingly, if a motion vector is selected for a block larger than 8×8, the encoder replicates the motion vector to represent the larger block. For example, if a motion vector is selected for a block of size 32×32 pixels, the encoder may replicate the motion vector to represent sixteen 8×8 pixel blocks. The encoder then analyzes the 8×8 pixel representation of the motion vectors to generate the dependency information.

Figure 11:
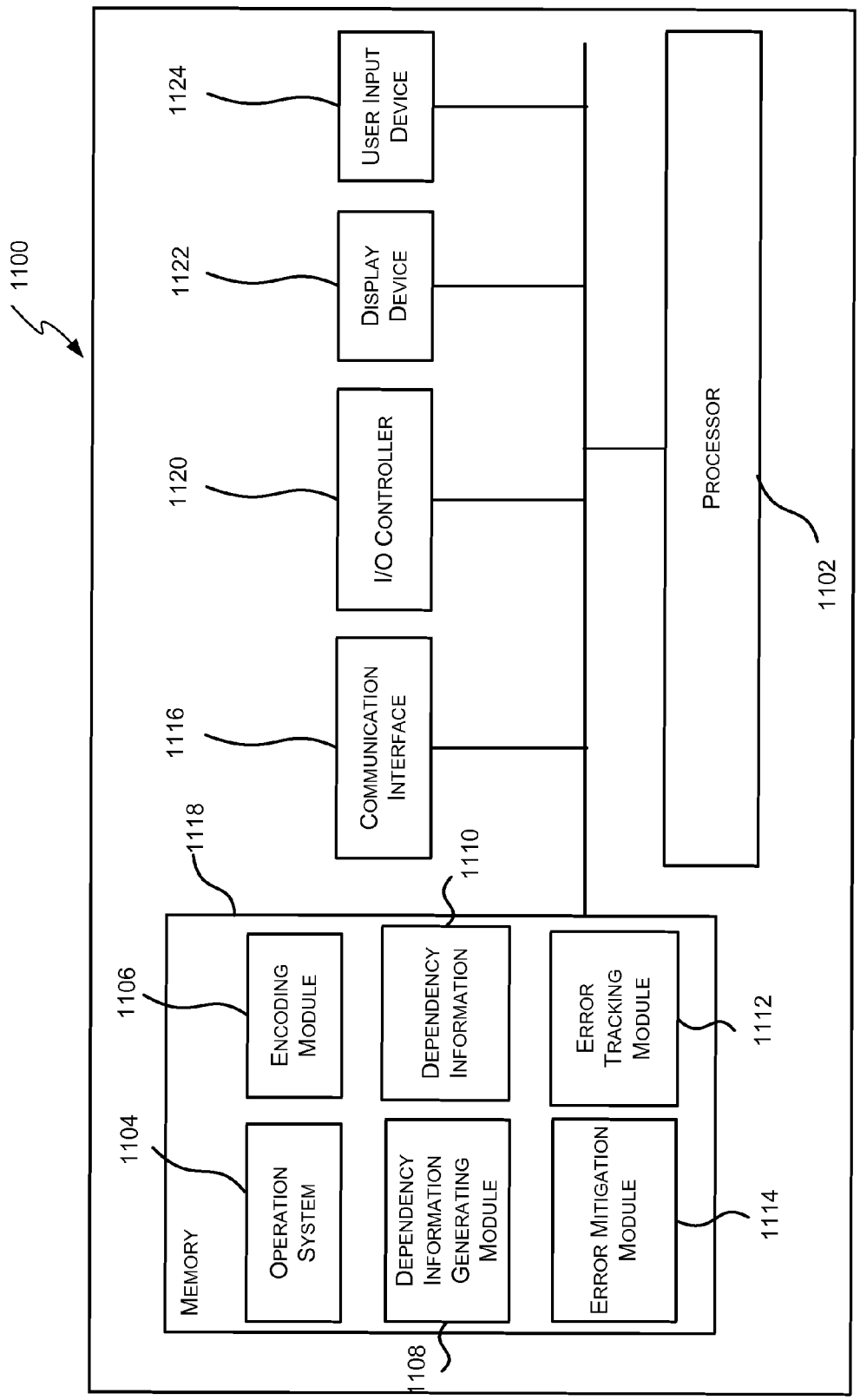
FIG. 11 is a block diagram of an exemplary computing-based device.

Reference is now made to FIG. 11 which illustrates various components of an exemplary computing-based device 1100 which may be implemented as any form of a computing and/or electronic device, and in which embodiments of the encoder 402 of FIG. 4 may be implemented.

The computing-based device 1100 comprises one or more processors 1102 which may be microprocessors, controllers or any other suitable type of processors for processing computer executable instructions to control the operation of the device. In some examples, for example where a system on a chip architecture is used, the processors 1102 may include one or more fixed function blocks (also referred to as accelerators) which implement a part of the methods described above in hardware (rather than software or firmware). Platform software comprising an operating system 1104 or any other suitable platform software may be provided at the computing-based device to enable application software to be executed on the device. For example, the computing-based device 1100 may comprise an encoding module 1106 comprising code to encode frames of a video using a block motion compensation-based compression technique; a dependency information generating module 1108 comprising code for generating dependency information 1110 for each encoded frame (e.g. code to execute method 500 of FIG. 5); an error tracing module 1112 comprising code to trace an error in one frame to a subsequent frame using the dependency information 1110 (e.g. code to execute method 1000 of FIG. 10); and an error mitigation module 1114 comprising code for mitigating propagation of an error using the dependency information 1110 (e.g. code to execute method 700 of FIG. 7).

The computing device 1100 also comprises a communication interface 1116 which may be used to transmit the encoded frames to the decoder 404 and/or receive error notification messages from the decoder 404.

The computer executable instructions may be provided using any computer-readable media that is accessible by computing based device 1100. Computer-readable media may include, for example, computer storage media such as memory 1118 and communications media. Computer storage media, such as memory 1118 includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media (memory 1118) is shown within the computing-based device 1100 it will be appreciated that the storage may be distributed or located remotely and accessed via a network or other communication link (e.g. using the communication interface 1116).

The computing-based device 1100 may also comprise an input/output controller 1120 arranged to output display information to a display device 1122 which may be separate from or integral to the computing-based device 1100. The display information may provide a graphical user interface. The input/output controller 1120 may also be arranged to receive and process input from one or more devices, such as a user input device 1124 (e.g. a mouse or a keyboard). In an embodiment the display device 1122 may also act as the user input device 1124 if it is a touch sensitive display device. The input/output controller 1120 may also output data to devices other than the display device, e.g. a locally connected printing device (not shown in FIG. 11).

The term 'processor' and 'computer' are used herein to refer to any device, or portion thereof, with processing capability such that it can execute instructions. The term 'processor' may, for example, include central processing units (CPUs), graphics processing units (GPUs or VPUs), physics processing units (PPUs), radio processing units (RPUs), digital signal processors (DSPs), general purpose processors (e.g. a general purpose GPU), microprocessors, any processing unit which is designed to accelerate tasks outside of a CPU, etc. Those skilled in the art will realize that such processing capabilities are incorporated into many different devices and therefore the term 'computer' includes set top boxes, media players, digital radios, PCs, servers, mobile telephones, personal digital assistants and many other devices.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to an item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

The invention claimed is:

1. A computer-implemented method of tracing an error in a frame of a video to a subsequent frame of the video, each frame in the video being divided into a plurality of blocks arranged in a number of rows and columns, each frame of the video being encoded by a technique that comprises generating motion vectors for blocks of the frame, the method comprising, by one or more processors:
   (a) receiving an error notification message, the error notification message comprising information identifying an erroneous frame of the video and information identifying portions of the erroneous frame detected as having an error during decoding;
   (b) identifying a frame following the erroneous frame as a reference frame;
   (c) obtaining minimum and maximum horizontal motion vector components for each column of blocks of the reference frame;
   (d) obtaining minimum and maximum vertical motion vector components for each row of blocks of the reference frame; and
   (e) identifying a rectangular region of blocks of the reference frame that the error is likely to have propagated to by tracing the identified portions of the erroneous frame to a rectangular region of blocks comprising one or more columns of the reference frame and one or more rows of the reference frame using the minimum and maximum horizontal and vertical motion vector components for the reference frame.

2. The method of claim 1, further comprising:
   (f) determining whether the frame immediately following the reference frame is a next frame to be encoded by an encoder; and
   (g) in response to determining that the frame immediately following the reference frame is not the next frame to be encoded by the encoder, identifying the frame immediately following the reference frame as the reference frame and repeating (c) to (g).

3. The method of claim 1, wherein identifying the rectangular region of the reference frame comprises:
   identifying rows of the reference frame that the error is likely to have propagated to from the maximum and minimum vertical motion vector components for the reference frame; and identifying columns of the reference frame that the error is likely to have propagated to from the maximum and minimum horizontal motion vector components for the reference frame;

wherein the rectangular region of the reference frame is defined as the intersection of the identified rows and columns.

4. The method of claim 3, wherein the information identifying the portions of the erroneous frame detected as having an error during decoding comprises a frame error map identifying the blocks of the erroneous frame detected as having an error during decoding.

5. The method of claim 4, wherein identifying the rectangular region of the reference frame comprises converting the frame error map to a row error map identifying the rows of the erroneous frame detected as having an error during decoding and a column error map identifying the columns of the erroneous frame detected as having an error during decoding.

6. The method of claim 3, wherein the information identifying the portions of the erroneous frame detected as having an error during decoding comprises a row error map identifying the rows of the erroneous frame detected as having an error during decoding and a column error map identifying the columns of the erroneous frame detected as having an error during decoding.

7. The method of claim 6, wherein:

the rows of the reference frame that the error is likely to have propagated to are identified from the row error map for a previous frame and the maximum and minimum vertical motion vector components for the reference frame, the previous frame being the frame immediately preceding the reference frame in the video; and the columns of the reference frame that the error is likely to have propagated to are identified from the column map for the previous frame and the maximum and minimum horizontal motion vector components for the reference frame.

8. The method of claim 7, wherein the rows of the reference frame that the error is likely to have propagated to are identified using the following formulas:

$$PropRowErrorMap(BlkIdx) = \bigvee_{Idx=StartIdx(BlkIdx)}^{EndIdx(BlkIdx)} RowErrowMap(Idx)$$

$$\forall BlkIdx = 0 \rightarrow TotalBlockRows$$

$$StartIdx(BlkIdx) = BlkIdx + Int\left(\frac{MinMVy(Blkidx)}{BLKHEIGHT}\right)$$

$$EndIdx(BlkIdx) = BlkIdx + Int\left(\frac{MaxMVy(Blkidx) + ROUNDFACTOR}{BLKHEIGHT}\right)$$

where PropRowErrorMap is an array having an entry for each row of the reference frame, each entry indicating whether the error is likely to have propagated to the corresponding row, RowErrorMap is the row error map for the previous frame, MinMVy is the minimum vertical motion vector components for the reference frame, MaxMvy is the maximum vertical motional vector components for the reference frame, TotalBlockRows is the number of rows of blocks in the reference frame, BLKHEIGHT is the height of the blocks and ROUNDFACTOR is a rounding factor.

9. The method of claim 7, wherein the columns of the reference frame that the error is likely to have propagated to are identified using the following formulas:

$$PropColErrorMap(BlkIdx) = \bigvee_{Idx=StartIdx(BlkIdx)}^{EndIdx(BlkIdx)} ColErrorMap(Idx)$$

$$\forall BlkIdx = 0 \rightarrow TotalBlockCols$$

$$StartIdx(BlkIdx) = BlkIdx + Int\left(\frac{MinMVx(Blkidx)}{BLKHEIGHT}\right)$$

$$EndIdx(BlkIdx) = BlkIdx + Int\left(\frac{MaxMVx(Blkidx) + ROUNDFACTOR}{BLKWIDTH}\right)$$

where PropColErrorMap is an array having an entry for each column of the reference frame, each entry indicating whether the error is likely to have propagated to the corresponding row, ColErrorMap is the column error map for the previous frame, MinMVx is the minimum horizontal motion vector components for the reference frame, MaxMvx is the maximum horizontal motional vector components for the reference frame, TotalBlockCols is the number of columns of blocks in the subsequent frame, BLKWIDTH is the width of the blocks in the reference frame and ROUNDFACTOR is a rounding factor.

10. The method of claim 1, further comprising:

modifying the reference frame to identify the blocks in the identified rectangular region as being unusable for inter-frame encoding; and encoding the next frame using the modified reference frame.

11. The method of claim 10, wherein encoding the next frame using the modified reference frame comprises intra-frame encoding each block of the next frame that references a block in the modified reference frame identified as being unusable for inter-frame encoding.

12. The method of claim 10, wherein encoding the next frame using the modified reference frame comprises encoding each block of the next frame that references a block in the modified reference frame identified as being unusable for inter-frame encoding using information in the frame immediately preceding the erroneous frame.

13. A video encoder to trace an error in a frame of a video to a subsequent frame of the video, each frame in the video being divided into a plurality of blocks arranged in a number of rows and columns, each frame of the video being encoded by a technique that comprises generating motion vectors for blocks of the frame, the encoder comprising:

a communications interface configured to receive an error notification message, the error notification message comprising information identifying an erroneous frame and information identifying portions of the erroneous frame detected as having an error during decoding; and a processor in communication with the communications interface, the processor configured to:

a. identify a frame following the erroneous frame in the video as a reference frame;

b. obtain minimum and maximum horizontal motion vector components for each column of blocks of the reference frame;

c. obtain minimum and maximum vertical motion vector components for each row of blocks of the reference frame; and d. identify a rectangular region of blocks of the reference frame that the error is likely to have propagated by tracing the identified portions of the erroneous frame to a rectangular region of blocks comprising one or more columns of the reference frame and one or more rows of the reference frame using the minimum and maximum horizontal and vertical motion vector components for the reference frame.

14. The video encoder of claim 13, wherein the processor is further configured to:
   e. determine whether the frame immediately following the reference frame in the video is a next frame to be encoded by the video encoder; and
   f. in response to determining that the frame immediately following the reference frame is not the next frame to be encoded by the video encoder, identify the frame immediately following the reference frame as the reference frame and repeat b to f.

15. The video encoder of claim 13, wherein identifying the rectangular region of blocks of the reference frame comprises:
   identifying rows of the reference frame that the error is likely to have propagated to from the maximum and minimum vertical motion vector components for the reference frame; and
   identifying columns of the reference frame that the error is likely to have propagated to using the maximum and minimum horizontal motion vector components for the reference frame;
   wherein the rectangular region of the reference frame is defined as the intersection of the identified rows and columns.

16. The video encoder of claim 13, wherein the processor is further configured to:
   modify the reference frame to identify the blocks in the identified rectangular region as being unusable for inter-frame encoding; and
   encode a next frame using the modified reference frame.

17. A non-transitory computer readable storage medium having stored thereon computer readable instructions that, when executed at a computer system for generating a representation of a digital circuit from definitions of circuit elements and data defining rules for combining those circuit elements, cause the computer system to generate a video encoder as set forth in claim 13.

18. A non-transitory computer readable storage medium having stored thereon computer executable program code that when executed causes at least one processor to:
   (a) receive an error notification message, the error notification message comprising information identifying an erroneous frame of the video and information identifying portions of the erroneous frame detected as having an error during decoding;
   (b) identify a frame following the erroneous frame as a reference frame;
   (c) obtain minimum and maximum horizontal motion vector components for each column of blocks of the reference frame;
   (d) obtain minimum and maximum vertical motion vector components for each row of blocks of the reference frame; and
   (e) identify a rectangular region of blocks of the reference frame that the error is likely to have propagated to by tracing the identified portions of the erroneous frame to a rectangular region of blocks comprising one or more columns of the reference frame and one or more rows of the reference frame using the minimum and maximum horizontal and vertical motion vector components for the reference frame.

* * * * *